United States Patent
Parnafes et al.

(10) Patent No.: US 6,839,766 B1
(45) Date of Patent: *Jan. 4, 2005

(54) METHOD AND APPARATUS FOR COMMUNICATING COPS PROTOCOL POLICIES TO NON-COPS-ENABLED NETWORK DEVICES

(75) Inventors: Itzhak Parnafes, Cupertino, CA (US); Shai Mohaban, Sunnyvale, CA (US); Keith McCloghrie, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/482,326

(22) Filed: Jan. 14, 2000

(51) Int. Cl.[7] .............................................. G06F 15/16
(52) U.S. Cl. ....................... 709/232; 709/228; 370/466
(58) Field of Search ............................... 709/228, 230, 709/223, 224, 246, 238, 232; 707/11, 105; 370/466, 467

(56) References Cited

U.S. PATENT DOCUMENTS

| | | | | |
|---|---|---|---|---|
| 5,751,967 A | * | 5/1998 | Raab et al. | 709/228 |
| 5,797,128 A | * | 8/1998 | Birnbaum | 707/5 |
| 5,819,042 A | * | 10/1998 | Hansen | 709/222 |
| 5,822,569 A | * | 10/1998 | McPartlan et al. | 703/21 |
| 5,889,953 A | * | 3/1999 | Thebaut et al. | 709/221 |
| 5,950,195 A | * | 9/1999 | Stockwell et al. | 707/4 |
| 5,968,176 A | * | 10/1999 | Nessett et al. | 713/201 |
| 5,983,270 A | * | 11/1999 | Abraham et al. | 709/224 |
| 6,167,445 A | * | 12/2000 | Gai et al. | 709/223 |
| 6,226,676 B1 | * | 5/2001 | Crump et al. | 709/227 |
| 6,282,581 B1 | * | 8/2001 | Moore et al. | 709/316 |
| 6,311,278 B1 | * | 10/2001 | Raanan et al. | 713/201 |
| 6,381,639 B1 | * | 4/2002 | Thebaut et al. | 709/222 |
| 6,405,254 B1 | * | 6/2002 | Hadland | 709/230 |
| 6,434,624 B1 | * | 8/2002 | Gai et al. | 709/232 |
| 6,446,200 B1 | * | 9/2002 | Ball et al. | 713/1 |

(List continued on next page.)

OTHER PUBLICATIONS

Herzog et al. "RFC 2749, COPS usage for RSVP", Jan. 2000.*
Durham et al. RFC 2748, The COPS (Common Open Policy Service) Protocol, Jan. 2000.*
"The COPS Protocol", Nov. 1999; http://search.ietf.org/internet–drafts/draft–ietf–rap–cops–08.txt.
"COPS Usage for Policy Provisions", Oct. 1999; http//search.ietf.org/internet–drafts/draft–ietf–rap–pr–01.txt.

*Primary Examiner*—William C. Vaughn, Jr.
(74) *Attorney, Agent, or Firm*—Hickman Palermo Truong & Becker LLP

(57) ABSTRACT

A method and apparatus for communicating a COPS protocol policy to a non-COPS-enabled network device (i.e., a device or one or more interfaces included in the device) is provided. A COPS proxy is networked with a policy server and a non-COPS-enabled network device such that the COPS proxy can communicate with the policy server and the non-COPS-enabled network device. The policy server is configured to communicate COPS protocol policies to the COPS proxy, which, in turn, is configured to translate the COPS protocol policy into a policy that is in accordance with a policy protocol that the non-COPS-enabled network device can receive and correctly interpret (a "non-COPS protocol"). The translation of the policy utilizes a mapping database that delineates predetermined relationships between COPS protocol policies and the non-COPS protocol policies. More specifically, the mapping database can include relationships between COPS protocol policy information base variables, network device roles and characteristics, and non-COPS protocol parameters and associated values. Further, the COPS proxy can be configured to detect and reconcile policy conflicts for one or more network devices.

24 Claims, 4 Drawing Sheets

U.S. PATENT DOCUMENTS

| | | | |
|---|---|---|---|
| 6,453,349 B1 * | 9/2002 | Kano et al. | 709/226 |
| 6,487,206 B1 * | 11/2002 | Baruch et al. | 370/395.1 |
| 6,487,594 B1 * | 11/2002 | Bahlmann | 709/225 |
| 6,502,131 B1 * | 12/2002 | Vaid et al. | 709/224 |
| 6,539,425 B1 * | 3/2003 | Stevens et al. | 709/220 |
| 6,578,076 B1 * | 6/2003 | Putzolu | 709/223 |
| 6,611,864 B2 * | 8/2003 | Putzolu et al. | 709/223 |
| 2001/0056459 A1 * | 12/2001 | Kurose et al. | 709/201 |
| 2002/0035641 A1 * | 3/2002 | Kurose et al. | 709/241 |

* cited by examiner

| PIB VARIABLE (Y) | NETWORK DEVICE CHARACTERISTIC (K) | POLICY PARAMETER (P) | POLICY PARAMETER VALUE (V) |
|---|---|---|---|
| a | f=1 AND g=1 | q | 10 |
| | | r | 122 |
| | h=2 | q | 22 |
| b | f=1 AND g=1 | q | 96 |
| | j=1 | s | 12 |
| | | t | 102 |

METHOD AND APPARATUS FOR COMMUNICATING COPS PROTOCOL POLICIES TO NON-COPS-ENABLED NETWORK DEVICES

FIELD OF THE INVENTION

The present invention relates generally to computer networks, and more specifically, to a method and apparatus for communicating policies per COPS protocol, to network devices that are not capable of accepting policies via the COPS protocol.

BACKGROUND OF THE INVENTION

A computer network typically comprises a plurality of interconnected entities that transmit ("source") and entities that receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetwork known as the Internet.

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connection-less transport protocol, and TCP which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are reassembled and passed up the layers of the destination entity's communication stack. At each layer, the corresponding message headers are also stripped off, thereby recovering. the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers that are utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

Allocation of Network Resources

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

Computer networks include numerous services and resources for use in moving traffic flows throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc. Each logical network interface (LI) of a network device can provide a different service or resource. For ease of explanation, the term "device" or "network device," unless expressly indicated otherwise, hereinafter refers to the device in its entirety or one more ports/interfaces/LI's of the device.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard. The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS" treatments) to each traffic flow. In particular, the network administrator may want a stock quote message to be given higher priority than a print transaction. Similarly, a $1 million stock transaction message for a premium client may be assigned higher priority than a $100 stock transaction message for a standard customer.

Each network device, or logical network interface LI therein, can be associated with one or more policies to be applied to the appropriate traffic flows in accordance with the traffic flow markings, with other parameters such as Layer 3 parameters (e.g., IP addresses and port numbers), with application level parameters which are attached to (or were extracted from) the traffic flow, or with a combination of one or more thereof. Each policy may be assigned to one or more network devices. One way to facilitate such assignment is through role management. Role management includes assigning one or more roles to each network device, and associating one or more policies with those roles. Thus, the policies and network devices are mapped in groups according to the roles.

Each network device may be configured to receive such policies communicated in accordance with one or more formats, or protocols. Examples of such protocols include Command Line Interface ("CLI") and Simple Network Management Protocol ("SNMP"). More recently, the IETF has proposed the Common Open Policy Service ("COPS") protocol for downloading policies to network devices. An IETF Internet Draft, entitled "The COPS (Common Open Policy Service) Protocol", last updated Nov. 6, 1999 and describing the COPS protocol, can currently be found at the Internet address http://search.ietf.org/internet-drafts/draft-ietf-rap-cops-08.txt, the entire text of which is incorporated herein by reference as if fully set forth herein. A related IETF Internet Draft, the entire text of which is incorporated herein by reference as if fully set forth herein, is entitled "COPS Usage for Policy Provisioning," was last updated Oct. 22, 1999, and can currently be found at httjp://search.ietf.org/internet-drafs/draft-ietf-rap-pr-01.txt. The COPS protocol can facilitate the communication of more abstract, less specific policies than, for example, CLI. Associated with the COPS protocol is a policy information base ("PIB") which includes multiple variables used to define policies to be downloaded to network devices. The PIB is defined in a rather abstract fashion, therefore it does not necessarily contain all details about each device-specific QoS feature. For example, the PIB can abstract the notion of a queuing mechanism by describing it in terms of the number of queues and number of thresholds. Therefore, it does not necessarily have to deal with such features as Priority Queuing, Custom Queuing, WFQ, etc. In contrast, use of CLI typically requires handling of very minor details of each feature of each specific LI on each specific device with each specific operating system.

The COPS protocol provides a standard protocol that facilitates improvements in policy communication, including scalability and security. However, network devices that are not configured to receive and interpret policies according to the COPS protocol (non-COPS-enabled), may not enjoy such benefits. Also, such network devices would not receive the appropriate policies when such policies are communicated only according to the COPS protocol. Therefore, networks including devices that are COPS-enabled as well as devices that are not COPS-enabled may require policy communication in accordance with both the COPS protocol and one or more other protocols that are appropriate to the non-COPS-enabled network devices. Furthermore, to maximize consistent behavior throughout the network, it is desirable to configure the network devices at substantially the same time, with the same policies in accordance with the same protocol.

Therefore, a mechanism for facilitating the communication of policies according to the COPS protocol to network devices that are non-COPS-enabled, is desired. In particular, it is desired to provide such a system and method with minimal complexity and maximum efficiency.

SUMMARY OF THE INVENTION

The foregoing advantages, and other advantages that will become apparent from the following description, are achieved by the present invention.

In an embodiment of the present invention, a method of communicating a policy, originally communicated in accordance with the COPS protocol and associated with a network device that is not capable of receiving and correctly interpreting a policy that is communicated in accordance with the COPS protocol, includes receiving device characteristic information about a network device, including receiving information regarding at least one appropriate protocol so that, when a policy is communicated to the network device according to the appropriate protocol, the network device is capable of receiving and correctly interpreting the policy. The method also includes communicating device information to a policy system, wherein the device information is based, at least in part, on the device characteristic information and receiving at least one COPS protocol policy configured in accordance with the COPS protocol, wherein the policy information is associated with the device information. Additionally, the method includes generating at least one appropriate protocol policy configured in accordance with the appropriate protocol and based, at least in part, on the at least one COPS protocol policy and the device characteristic information, and communicating the appropriate protocol policy to the network device.

In another embodiment of the present invention, a computer readable medium containing program instructions for communicating a policy, originally communicated in accordance with the COPS protocol and associated with a network device that is not capable of receiving and correctly interpreting a policy that is communicated in accordance with the COPS protocol, wherein when the computer readable medium is read by a computer system having a processor and memory, the program instructions are configured to be executed by the processor, includes program instructions for receiving device characteristic information about a network device, including receiving information regarding at least one appropriate protocol that, when a policy is communicated to the network device according to the appropriate protocol, the network device is capable of receiving and correctly interpreting the policy. The computer readable medium also includes program instructions for communicating device information to a policy system, wherein the device information is based, at least in part, on the characteristic information and program instructions for receiving at least one COPS protocol policy configured in accordance with the COPS protocol, wherein the policy information is associated with the device information. The computer readable medium further includes program instructions for generating at least one appropriate protocol policy configured in accordance with the appropriate protocol and based, at least in part, on the at least one COPS protocol policy and the device characteristic information and program instructions for communicating the appropriate protocol policy to the network device.

In yet another embodiment, a system for communicating a policy, originally communicated in accordance with the COPS protocol and associated with a network device that is not capable of receiving and correctly interpreting a policy that is communicated in accordance with the COPS protocol includes a communication receiver configured to receive device characteristic information associated with a network device and to receive at least one COPS protocol policy, associated with the network device, from a policy system. The system also includes a policy protocol translator configured to translate the at least one COPS protocol policy into at least one associated appropriate protocol policy that is receivable and correctly interpretable by the network device and a communication transmitter configured to transmit the device characteristic information to the policy system, and to transmit the at least one appropriate protocol policy to the network device.

Other features and aspects will become apparent from the following detailed description.

BRIEF DESCRIPTION OF THE DRAWINGS

The present invention is illustrated by way of example, and not by way of limitation, in the figures of the accompanying drawings in which like reference numerals refer to similar elements and in which.

DETAILED DESCRIPTION OF THE PREFERRED EMBODIMENT

A method and apparatus is described for facilitating policy-based management of quality of service treatments of network data traffic flows, by facilitating the receipt and interpretation of policies, in accordance with COPS protocol, by non-COPS-enabled devices. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Proxy System

1. Overview

Figure 1A:
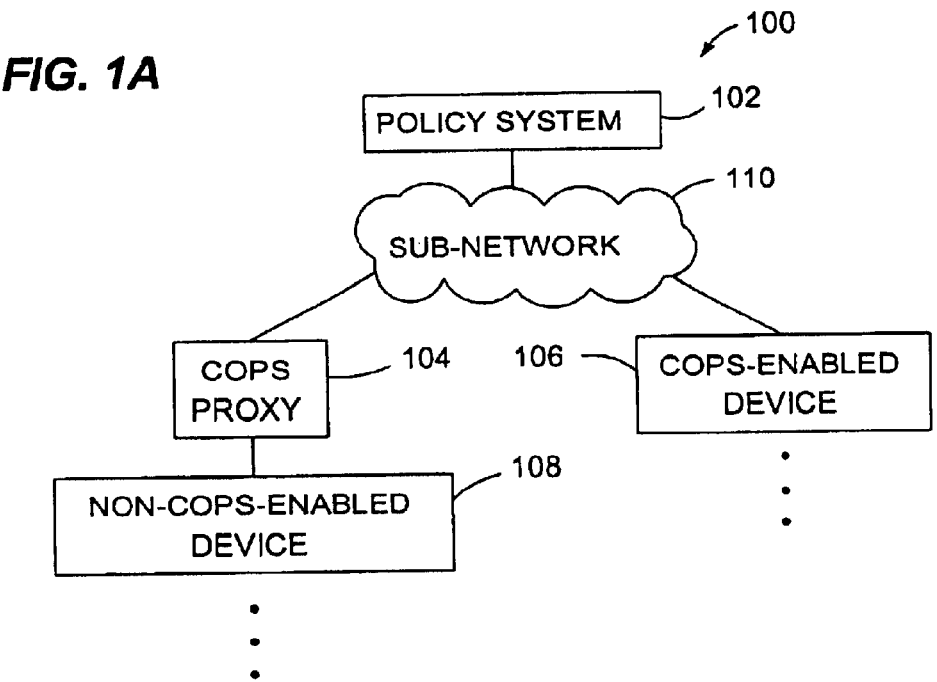
FIG. 1A is a block diagram of a network portion including a COPS proxy, in accordance with an embodiment of the present invention.
Figure 1B:
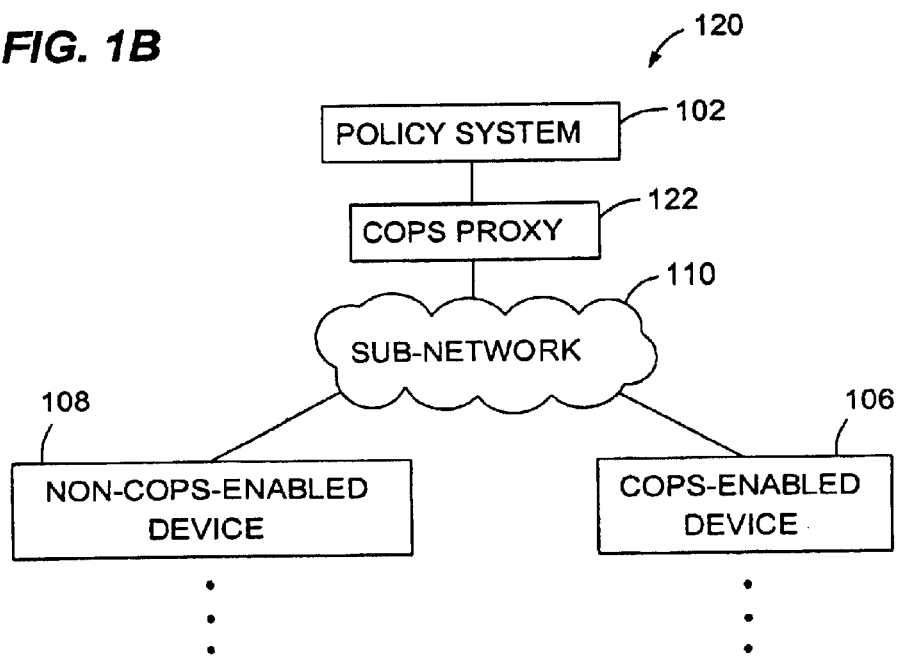
FIG. 1B is a block diagram of an alternative network portion including a COPS proxy, in accordance with an embodiment of the present invention.

FIG. 1A and FIG. 1B are block diagrams of exemplary computer networks configured to facilitate communications of COPS protocol policies to non-COPS-enabled devices. The network 100 of FIG. 1A includes a policy system 102, a COPS proxy 104, one or more COPS-enabled network devices 106, one or more non-COPS-enabled network devices 108, and the remainder of the network, or subnetwork 110. Each of these components are included within a network, with the COPS proxy 104 in communication with the policy system 102 and with one or more non-COPS-enabled network devices. The system may alternatively include only non-COPS-enabled network devices and/or more than one policy system 102.

The policy system 102 can be any system, including a policy server, which generates and communicates policies to devices of the network 100. Exemplary policy systems 102 include QoS Policy Manager (QPM) available from Cisco Systems, Inc. of San Jose, Calif., and FloodGate available from CheckPoint Software Technologies Ltd. of Redwood City, Calif. The policy system 102 is configured to download policies to one or more network devices utilizing the COPS protocol. The COPS-enabled network device 106 can be any network device that is configured to receive and interpret policies that are communicated in accordance with the COPS protocol.

The non-COPS-enabled device 108 can be any type of network device that, alone, is not configured to receive and correctly interpret policies according to the COPS protocol. For example, the non-COPS-enabled device 108 can be a network device configured to receive and correctly interpret policies only according to CLI or SNMP, such as a network device manufactured before the COPS protocol was defined.

The COPS proxy 104 is configured to receive COPS protocol policies from the policy system 102. To this end, the COPS proxy 104 is configured to open a communication with the policy system 102, as would a network device that is COPS-enabled. The COPS proxy 104 is also configured to correctly interpret the COPS protocol policies and translate them into policies according to one or more protocols appropriate to the non-COPS-enabled network device. This is facilitated by utilizing a mapping database, as described below with reference to FIG. 2. The functionality of the COPS proxy 104 is further described below with reference to FIG. 3.

FIG. 1B is a block diagram of a computer network 120, in accordance with another embodiment of the present invention. The computer network 120 includes components similar to the network 100 of FIG. 1A, including the policy system 102, COPS-enabled network device(s) 106, non-COPS-enabled device(s) 108, and subnetwork 110. In addition, the computer network 120 includes a COPS proxy 122 that is networked with the policy system 102, with one or more non-COPS-enabled network device(s) 108, and with one or more of the COPS-enabled network device(s) so as to facilitate communication between each and the COPS proxy 122.

Here, the COPS proxy 122 is configured to open a communication with the policy system 102, as would a network device that is COPS-enabled. The COPS proxy 104 is also configured to receive COPS protocol policies from the policy system 102. The COPS proxy 104 further has the capability to pass to the appropriate COPS-enabled network device 106, the COPS protocol policies that are addressed to that device. Alternatively or additionally, the COPS proxy 122 is configured to correctly interpret the COPS protocol policies and translate them into policies according to one or more protocols appropriate to the network device to which the policy is targeted. In particular, when a policy is targeted to a non-COPS-enabled network device 108, the COPS proxy 122 is configured to translate the COPS protocol policy into the appropriate protocol which can be received and correctly interpreted by the targeted device. As with the COPS proxy 104 of FIG. 1A, this is facilitated by utilizing a mapping database, as described below with reference to FIG. 2. The functionality of the COPS proxy 122 is further described below with reference to FIG. 3.

2. Mapping Database

Figures 2, 3:
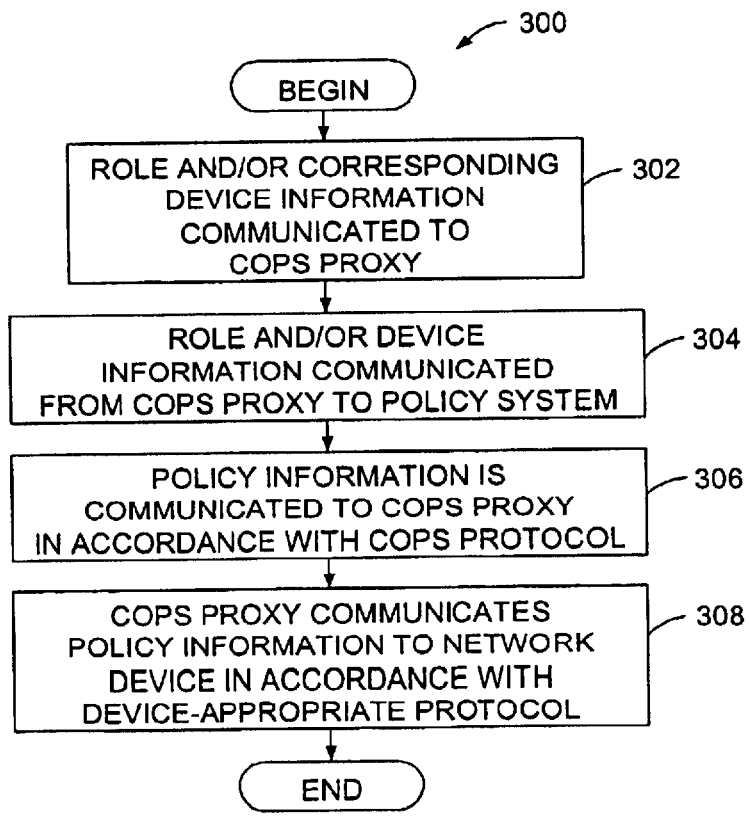
FIG. 2 is a chart of an exemplary mapping database, in accordance with an embodiment of the present invention.
FIG. 3 is a flow diagram of a method for communicating a COPS protocol policy to a non-COPS-enabled network device, in accordance with an embodiment of the present invention.

FIG. 2 is a table representing an exemplary mapping database 200 of the COPS proxy 104 of FIG. 1A. In particular, the mapping database 200 is configured to facilitate COPS protocol policy communication with CLI-enabled network devices. The mapping database 200 includes predetermined relations between PIB variables Y, network device characteristics K (singular or combined), and protocol-specific policy parameters P and their associated values V. Examples of PIB variables Y are preferred queuing mechanisms, Access Control Lists (ACLs), and actions such as marking, policing, etc. Network device characteristics define one or more aspects of the device and can include queuing mechanisms such as WFQ, CQ, PQ, etc.; ACL types; and/or actions such as marking with 802.1p priorities, or marking with DSCP values; etc. supported by the network device. The protocol-specific policy parameters (in this case CLI-specific policy parameters) and their values help define the CLI version of the COPS protocol policy represented by the PIB variables. It should be understood that the associated values V may have components that are numeric, logical, operational, and/or otherwise in nature.

As an exemplary relationship of the mapping database 200, for a network device having a characteristic K of a first type (e.g., f=1 and g=1), a given PIB variable Y=a may be associated with the CLI policy parameters P=q and P=r, with q and r having the values of 10 and 122, respectively. As another example, the same PIB variable Y=a may be associated with a CLI parameter P=q, and q having a value of 22, for a network device having a characteristic K of a second type (e.g., h=2).

The mapping database can include any suitable number of PIB variables Y (e.g., the superset of those used by all known COPS-based policy systems). In addition, any suitable number of network device characteristics K can be mapped to an associated PIB variable Y. For example, the mapping database can so include any characteristics of any network device that is capable of performing according to the policy represented by the associated PIB variable Y. Furthermore, each pair of PIB variable Y and network device characteristic K can be associated with one or more policy parameters P and their associated values V.

It should be appreciated that the mapping database 200 can alternatively or additionally include mapping of PIB parameters and device characteristics with corresponding policy parameters, values, variables, or otherwise associated with other protocols, such as SNMP. Additionally or alternatively, the mapping database may further include a correlation of device roles to PIB variables, device characteristics, policy parameters, and policy values, which can be used to translate a role-oriented policy from the policy system into an appropriate policy for a given network device (refer to FIG. 4 and related discussion below). Furthermore, the mapping database can also be configured to map PIB parameters and device characteristics to COPS protocol information, to facilitate policy communication to COPS-enabled network devices. Such a configuration may be appropriate for the COPS proxy 122 of FIG. 1B.

The representation of the mapping database 200 in FIG. 2 is illustrative only, and not limiting. It will be recognized by those skilled in the art, that the above-described relationships can be delineated in one or more alternative fashions. For example, databases such as relational databases or object-oriented databases may be used to facilitate the delineation of these relationships. As another example, one or more portions of the PIB may be described by software defining the various relationships, thereby substantially eliminating the need to list in the database an entry for every combination of the various parameters, capabilities, hardware, interface types, operating systems, etc. Furthermore, the software, which can be termed "mapping software," can be extendable by being configured in a modular way, such that mapping modules (otherwise known as "drivers") can be later added for new devices or groups of devices. For example, the mapping can initially contain a module for translating COPS policies to a particular manufacturer's devices using a given IOS release. Later, new modules can be added (for example, configuration files) to support new kinds of devices, interfaces or operating systems.

The COPS proxy 104 or 122 can utilize the various relationships of the mapping database to form appropriate policies, in accordance with the CLI (or other suitable) protocol, that correspond to given COP protocol policies. Such operation is further described below with reference to FIG. 3.

Functionality

FIG. 3 is a flow diagram of a method 300 for facilitating the receipt of COPS protocol policies by non-COPS-enabled network devices, in accordance with an embodiment of the present invention. Before method 300 is performed, the COPS proxy can be configured with the address of one or more proxy systems and network devices and one or more roles can be assigned to a given network device. Such roles can be assigned by a role manager or other role assigning system associated with the network. In operation 302, the role (if assigned) and/or device information regarding the given network device is communicated to a COPS proxy. This can be performed, for example, during configuration of the given network device. The roles can be, for example, "Edge" (interfaces connecting one network to another), "Backbone" (interfaces in the background of the network), "Fast Links" (links with speed above 1 Mbit/sec), "Serial interfaces," "Voice" (interfaces carrying voice), "ERP" (interfaces carrying ERP applications), etc. The device information can include any suitable information that defines characteristics of the network device, such as the network device address, the IOS version, interface features, and acceptable policy protocols for which the network device is enabled. The role and/or device information is communicated from the COPS proxy to the policy system in operation 304. This may include the COPS proxy opening a TCP connection to a policy server of the policy system. The role, device information, and/or form of communication may be similar to or different than the communication to the COPS proxy in operation 302. In particular, the communication of operation 304 is configured so as to be correctly interpreted by the policy system and emulating a communication from a COPS-enabled network device. In this way, the COPS proxy can seem to be a COPS-enabled network device from the perspective of the policy system, and seem to be an appropriate-protocol-configuration agent, from the perspective of the network devices. Accordingly, operation 304 may include translation of the role or combination of roles of the network device, and/or of the device information into a format suitable for use by the policy system.

The policy system communicates policy information, for the network device, to the COPS proxy in operation 306. Specifically, the policy information is communicated in accordance with the COPS protocol and corresponds to the role and/or device information passed in operation 304. The policy information includes one or more policy information base (PIB) variables that represent a COPS protocol policy. In operation 308, the COPS proxy communicates policy information to the given network device. This communication is in accordance with a protocol for which the given network device is enabled. Thus, the policy information of operation 308 corresponds to, but is in a different format than, the policy information passed in operation 306 from the policy system to the COPS proxy.

Figure 4:
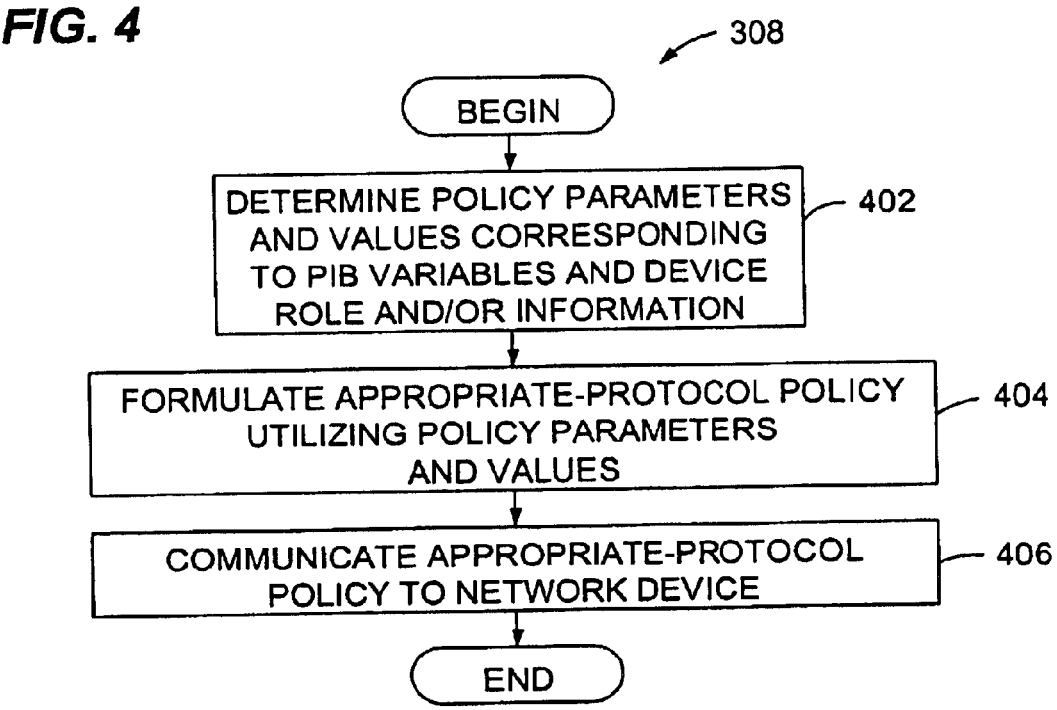
FIG. 4 is a flow diagram of an operation for communicating policy information between the COPS proxy and a network device in the method of FIG. 3, in accordance with an embodiment of the present invention.

FIG. 4 is a flow diagram of exemplary operations of operation 308 in FIG. 3. In operation 402 the COPS proxy determines non-COPS policy parameters and values that correspond to the policy information, including the PIB variables, received from the policy system in operation 306 of FIG. 3. In particular, the non-COPS policy parameters and values corresponding to the given network device role and/or information are determined. The non-COPS policy parameters and values are chosen from those appropriate for the particular policy protocol by which the given network device is able to receive and interpret policies, for example CLI or SNMP. The correlation of PIB variables, device information (i.e., device characteristics), policy parameters and policy parameter values can be better understood by the exemplary table of FIG. 2 and the related discussion above. When the device role is utilized (e.g., when the policy from the policy system is role-oriented, and not device specific), the mapping database may further include a correlation of roles to device characteristics, policy parameters, and policy values. In this way, the COPS proxy can translate a role-oriented policy from the policy system into an appropriate policy for a given network device.

The COPS proxy formulates a non-COPS protocol policy in operation 404, utilizing the policy parameters and values determined in operation 402. This policy is specifically applicable to the given network device, corresponds to the COPS protocol policy of communicated to the COPS proxy in operation 306, and is configured to be received and correctly interpreted by the given network device, including complying with the policy protocol for which the network device is enabled. In operation 406, the non-COPS policy formulated in operation 404 is communicated to the given network device.

In some embodiments, when the given network device is COPS-enabled, the policy parameters and values and appropriate-protocol policy of operations 402 and 404, respectively, comply with the COPS protocol, and are substantially the same as the policy information communicated in operation 306 from the policy system to the COPS proxy. Alternatively, instead of operations 402 and 404, the COPS proxy can pass information, unmodified, between the COPS-enabled network device and the policy system. If the COPS proxy is not networked with a given COPS-enabled network device so as to allow for communication between the two, the above method 300 is not performed with respect to that device. If the COPS-enabled network device is networked with the policy server so as to allow for communication between those two, the policy communication can occur without operation of the COPS proxy.

The COPS proxy can also include the detection and/or resolution of policy conflicts that may arise between policies associated with a single network device. In some situations multiple policies may be received by the COPS proxy for an individual network device. For example, the network device may be associated with more than one role. Different policies may be received by the COPS proxy for each of such roles, potentially resulting in different policy parameters and values for each role. If these different policy parameters and values result in conflicting policies formulated by the COPS proxy, the COPS proxy can be configured to formulate non-conflicting policies based on predetermined relationships between the roles. For example, a conflict may arise when a first role of a network device is associated with a first type of queuing mechanism, and a second role of the network device is associated with a second type of queuing mechanism. The resolution can be determined by a pre-defined ordering of queuing mechanism types by order of preference. This ordering can be included in the PIB and can be different for different devices, different interface types (e.g., slow links, fast links), etc. As another example, a second role may be derived from a first role. In such a case, each conflict can be resolved by the second (i.e., derived) role overriding the first role. Further, certain policies might require capabilities that are not present in the network device associated with a certain role. To resolve such a conflict, a policy system may need to alert the user to this fact, or to take action according to a pre-defined conflict resolution logic.

The above described aspects of the present invention provide a simple, efficient mechanism for taking advantage of the benefits of the COPS protocol in communicating policies, while maximizing the use of existing network devices. With the present invention, both COPS-enabled and non-COPS-enabled network devices can be used with COPS-protocol policies. Because such policies can then be used with more network devices, there is more incentive, and/or less disincentive, to develop policies and policy systems in accordance with the COPS protocol. With more such policies and policy systems, in conjunction with the present invention, networks can be more secure, standardized, and scalable, while maintaining operating efficiency. Additionally, with the present invention a policy system configured to communicate policies via the COPS protocol only, without being configured to also communicate policies via other non-COPS protocols, can be used, thus simplifying the policy system design and operation.

Hardware Overview

Figure 5:
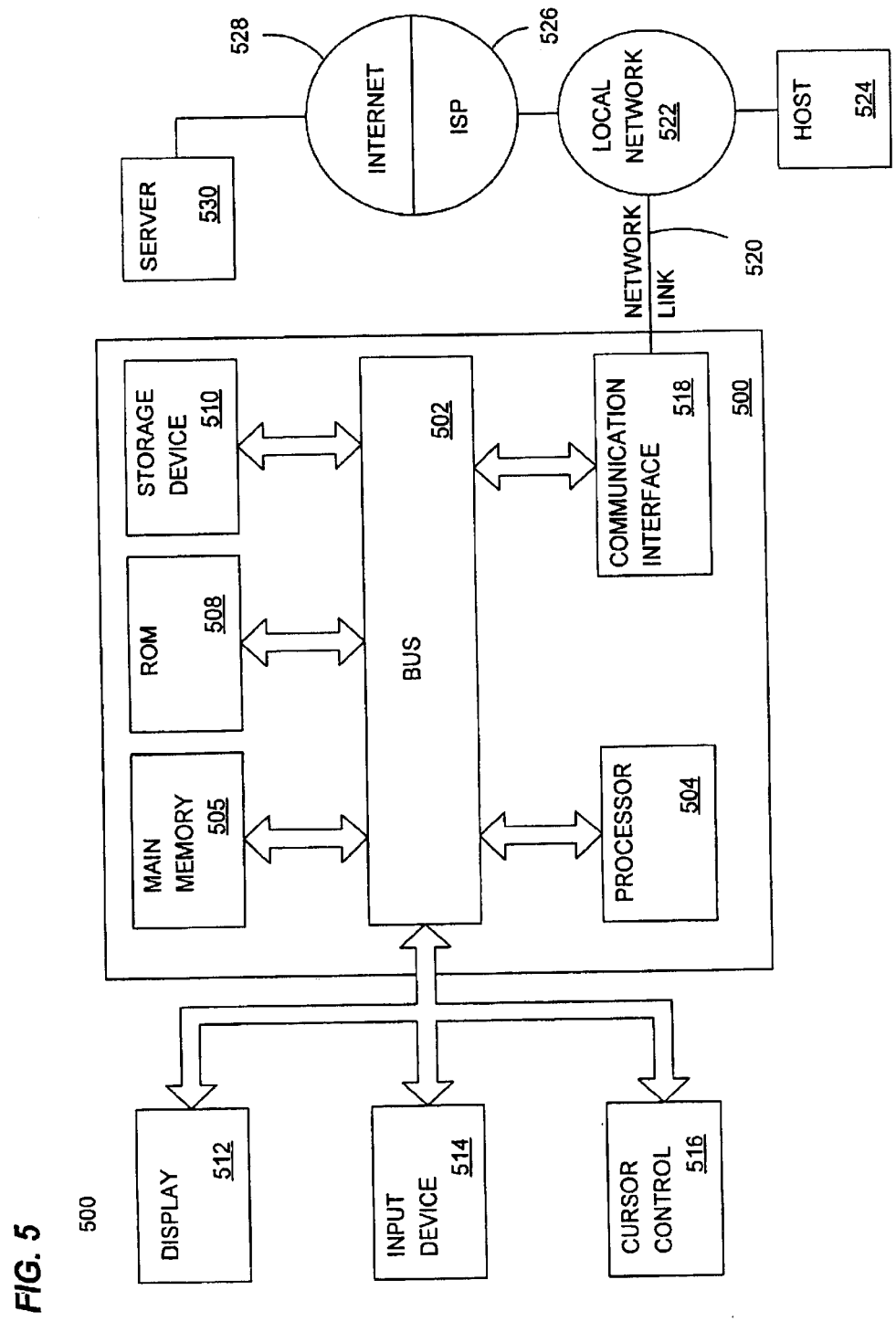
FIG. 5 is a block diagram of a computer system with which an embodiment of the present invention may be carried out.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for communicating COPS protocol policies to non-COPS-enabled network devices. According to one embodiment of the invention, communicating COPS protocol policies to non-COPS-enabled network devices is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for policy-based management of quality of service treatments of network data traffic flows by integrating policies with application programs as described herein.

The received code may be executed by processor 504 as it is received, and/or stored in storage device 510, or other non-volatile storage for later execution. In this manner, computer system 500 may obtain application code in the form of a carrier wave.

In summary, the present invention provides methods and apparatuses for communicating COPS protocol policies to non-COPS-enabled network devices, whereby greater standardization, security, and scalability can be realized while minimizing the network complexity and maximizing network efficiency. The invention has been described herein in terms of several specific embodiments. Other embodiments of the invention, including alternatives, modifications, permutations and equivalents of the embodiments described herein, will be apparent to those skilled in the art from consideration of the specification, study of the drawings, and practice of the invention. For example, while only one COPS proxy has been shown in the accompanying figures, more than one COPS proxy can be included in the network. Each COPS proxy can be configured to translate policies into all of the same, some of the same, or different protocols than the other COPS proxies. As another example, the COPS proxy and its operation can be configured to allow monitoring or further control of its translation process, or both, by a network user. Further, such allowance can be limited to one or more network users, such as a network administrator. Alternatively or additionally, the apparatuses and methods described herein can be appropriately modified to provide a proxy or proxy service which can translate policies that are in accordance with a given protocol other than COPS, into policies that can be understood by devices that without the proxy are otherwise not capable of understanding such a policy in accordance with the given protocol. The specification and drawings are, accordingly, to be regarded in an illustrative rather than a restrictive sense. The embodiments and specific features described above in the specification and shown in the drawings should be considered exemplary rather than restrictive, with the invention being defined by the appended claims, which therefore include all such alternatives, modifications, permutations and equivalents as fall within the true spirit and scope of the present invention.

What is claimed is:

1. A method of communicating a policy to a non-COPS enabled network device, comprising:

receiving a first set of device data about the non-COPS enabled network device, wherein the first set of device data includes data that identifies one or more appropriate protocols supported by the non-COPS enabled network device;

communicating a second set device data to a policy server, wherein the second set of device data is based on the first set of device data;

receiving a set of policy data, wherein the set of policy data is configured using the COPS protocol;

generating the policy by using the set of policy data and a set of role data, wherein the set of role data describes one or more roles of the non-COPS enabled network device;

detecting and resolving any conflicts arising from generating the policy using the set of policy data and the set of role data and further using a role assigned to the non-COPS enabled network device; and communicating the policy to the non-COPS enabled network device using one of the one or more appropriate protocols.

2. A method as recited in claim 1, wherein the first set of device data includes data that identifies the IOS version of the non-COPS enabled network device or interface features of the non-COPS enabled network device.

3. A method as recited in claim 1, wherein the step of generating the policy comprises generating the policy for use with the CLI protocol.

4. A method as recited in claim 1, wherein the step of generating the policy comprises generating the policy for use with the SNMP protocol.

5. A method as recited in claim 1, wherein the first set of device data comprises data that identifies at least one role to which the non-COPS enabled network device has been assigned.

6. A method as recited in claim 1, wherein the step of receiving the set of policy data comprises receiving data that identifies at least two conflicting COPS policies, and wherein the step of generating the policy comprises the step of resolving the at least two conflicting COPS policies.

7. A computer readable medium containing program instructions for communicating a policy to a non-COPS enabled network device, wherein when the computer readable medium is read by a computer system having a processor and memory, the program instructions are configured to be executed by the processor, the computer readable medium comprising:

program instructions for receiving a first set of device data about the non-COPS enabled network device, wherein the first set of device data includes data that identifies one or more appropriate protocols supported by the non-COPS enabled network device;

program instructions for communicating a second set of device data to a policy server, wherein the second set of device data is based on the first set of device data;

program instructions for receiving a set of policy data, wherein the set of policy data is configured using the COPS protocol;

program instructions for generating the policy by using the set of policy data and a set of role data, wherein the set of role data describes one or more roles of the non-COPS enabled network device;

detecting and resolving any conflicts arising from generating the policy using the set of policy data and the set of role data and further using a role assigned to the non-COPS enabled network device; and program instructions for communicating the policy to the non-COPS enabled network device using one of the one or more appropriate protocols.

8. A computer readable medium as recited in claim 7, wherein the program instructions for the first set of device data comprises data that identifies the IOS version of the non-COPS enabled network device or interface features of the non-COPS enabled network device.

9. A computer readable medium as recited in claim 7, wherein the program instructions for generating the policy include program instructions for generating the policy for use with the CLI protocol.

10. A computer readable medium as recited in claim 7, wherein the program instructions for generating the policy include program instructions for generating the policy for use with the SNMP protocol.

11. A computer readable medium as recited in claim 7, wherein the first set of device data comprises data that identifies at least one role to which the non-COPS enabled network device has been assigned.

12. A computer readable medium as recited in claim 7, wherein the set of policy data comprises data that identifies at least two conflicting COPS policies, and wherein the program instructions for generating the policy comprises program instructions for resolving the at least two conflicting COPS policies.

13. A system for communicating a policy to a non-COPS enabled network device, comprising:

a communication receiver configured to receive a first set of device data about the non-COPS enabled network device from the non-COPS enabled network device and a set of policy data from a policy server, wherein the communication receiver is configured to receive a set of role data that describes one or more roles of the non-COPS enablesd network device;

a policy translator configured to detect and resolve any conflicts arising from generating the policy using the set of policy data and the set of role data and further using a role assigned to the non-COPS enabled network device, wherein the policy is receivable and correctly interpreted by the non-COPS enabled network device; and a communication transmitter configured to transmit a second set of device data to the policy server and the policy to the non-COPS enabled network device, wherein the policy is transmitted using one of the one or more appropriate protocols.

14. A system as recited in claim 13, wherein the policy translator comprises a mapping database, wherein the mapping database comprises data that identifies predetermined correlations between the policy, the set of policy data, and the first set of device data.

15. A system as recited in claim 13, wherein the first set of device data comprises data that identifies one or more roles associated with the non-COPS enabled network device.

16. A system as recited in claim 13, wherein the first set of device data includes data that identifies the IOS version of the non-COPS enabled network device or interface features of the non-COPS enabled network device.

17. A system as recited in claim 13, wherein the policy is translated by policy translator for use with the CLI protocol.

18. A system as recited in claim 13, wherein the policy is translated by policy translator for use with the SNMP protocol.

19. A system for communicating a policy to a non-COPS enabled network device, comprising:

means for receiving a first set of device data about the non-COPS enabled network device, wherein the first set of device data includes data that identifies one or more appropriate protocols supported by the non-COPS enabled network device;

means for communicating a second set of device data to a policy server, wherein the second set of device data is based on the first set of device data;

means for receiving a set of policy data, wherein the set of policy data is configured using the COPS protocol;

means for generating the policy by using the set of policy data and a set of role data, wherein the set of role data describes one or more roles of the non-COPS enabled network device;

means for detecting and resolving any conflicts arising from generating the policy using the et of policy data and the set of role data and further using a role assigned to the non-COPS enabled network device; and means for communicating the policy to the non-COPS enabled network device using one of the one or more appropriate protocols.

20. A system as recited in claim 19, wherein the first set of device data includes data that identifies the IOS version of the non-COPS enabled network device or interface features of the non-COPS enabled network device.

21. A system as recited in claim 19, wherein the means for generating the policy comprises means for generating the policy for use with the CLI protocol.

22. A system as recited in claim 19, wherein the means for generating the policy comprises means for generating the policy for use with the SNMP protocol.

23. A system as recited in claim 19, wherein receiving the first set of device data comprises data that identifies at least one role to which the non-COPS enabled network device has been assigned.

24. A system as recited in claim 19, wherein the means for receiving the set of policy data comprises means for receiving data that identifies at least two conflicting COPS policies, and wherein the means for generating the policy comprises means for resolving the at least two conflicting COPS policies.

* * * * *

UNITED STATES PATENT AND TRADEMARK OFFICE
CERTIFICATE OF CORRECTION

PATENT NO. : 6,839,766 B1
DATED : January 4, 2005
INVENTOR(S) : Itzhak Parnafes et al.

It is certified that error appears in the above-identified patent and that said Letters Patent is hereby corrected as shown below:

Column 14,
Line 46, delete "enablesd" and insert therefor -- enabled --.

Signed and Sealed this

Twenty-ninth Day of March, 2005

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 6,839,766 B1 | Page 1 of 1 |
| APPLICATION NO. | : 09/482326 | |
| DATED | : January 4, 2005 | |
| INVENTOR(S) | : Itzhak Parnafes et al. | |

It is certified that error appears in the above-identified patent and that said Letters Patent is hereby corrected as shown below:

Claim 19
At column 15, line 28, delete "et" and insert --set--.

Signed and Sealed this

Eighteenth Day of September, 2007

JON W. DUDAS
*Director of the United States Patent and Trademark Office*